(12) United States Patent
Mills et al.

(10) Patent No.: US 7,903,122 B2
(45) Date of Patent: Mar. 8, 2011

(54) REPRESENTING A PRINTED PRODUCT USING IMAGE BLENDING

(75) Inventors: Joshua S. Mills, Marlborough, MA (US); Jay T. Moody, Wayland, MA (US)

(73) Assignee: Vistaprint Technologies Limited, Hamilton (BM)

( * ) Notice: Subject to any disclaimer, the term of this patent is extended or adjusted under 35 U.S.C. 154(b) by 737 days.

(21) Appl. No.: 11/735,838

(22) Filed: Apr. 16, 2007

(65) Prior Publication Data

US 2008/0252651 A1 Oct. 16, 2008

(51) Int. Cl.
*G09G 5/02* (2006.01)
(52) U.S. Cl. .......... 345/589; 345/418; 345/592; 345/612
(58) Field of Classification Search ................. None
See application file for complete search history.

(56) References Cited

U.S. PATENT DOCUMENTS

| | | | | |
|---|---|---|---|---|
| 5,109,290 | A * | 4/1992 | Imai | 349/2 |
| 5,864,342 | A * | 1/1999 | Kajiya et al. | 345/418 |
| 6,028,583 | A * | 2/2000 | Hamburg | 345/629 |
| 6,184,891 | B1 * | 2/2001 | Blinn | 345/426 |
| 6,943,803 | B1 * | 9/2005 | Cosman et al. | 345/581 |
| 6,961,067 | B2 * | 11/2005 | Moore | 345/589 |
| 7,199,903 | B2 | 4/2007 | Van de Capelle et al. | |
| 2003/0131237 | A1 * | 7/2003 | Ameline et al. | 713/176 |
| 2005/0137477 | A1 * | 6/2005 | Kockro | 600/437 |
| 2006/0286512 | A1 * | 12/2006 | Cogliano et al. | 434/95 |

OTHER PUBLICATIONS

Kemper, M., Vector Drawing and Effects in Flash and Illustrator, Nov. 2006, Apress, AdvancED Flash Interface Design, pp. 71-93.*
Iwata, K. and Marcu, G.G.: "Computer simulation of printed colors on textile materials" Proceedings of SPIE, 1994, pp. 228-238, XP007905044 SPIE p. 234-p. 238.

* cited by examiner

*Primary Examiner* — Said Broome
(74) *Attorney, Agent, or Firm* — Jessica J. Costa

(57) ABSTRACT

A design image is combined with a product image to create a composite image to illustrate the result of printing the design image onto the product. To create the composite image, the opacity of each pixel in the design image is set according to the brightness value of the pixel such that completely dark pixels are opaque, completely white pixels are transparent, and pixels having intermediate brightness values are assigned intermediate opacity values based on the brightness of the pixel. The design image pixels and the corresponding product image pixel are blended according to the opacity values of the design image pixels to create the composite image.

22 Claims, 5 Drawing Sheets

REPRESENTING A PRINTED PRODUCT USING IMAGE BLENDING

FIELD OF THE INVENTION

This invention relates to the displaying of product images on an electronic display and, more particularly, to the displaying of images depicting products having printed design elements.

BACKGROUND OF THE INVENTION

Printing services Web sites allowing a user to access the site from a computer located at the user's home or work and design and purchase an item of apparel, such as a t-shirt or other item, are well known and widely used by many consumers and businesses. Typically, these printing services sites allow the user to first review uncustomized images of the various products that are available from the provider. When the user selects a specific product to customize, the sites typically provide online tools allowing the user to provide the text that the user desires to appear on the customized product. The user is also typically allowed to either upload a full color image from the user's computer to be incorporated into the product design or select from a number of decorative designs, images, and other graphic elements that are provided for the user's use by the printing services provider. Images of the user text entries and the user-selected decorative elements, collectively referred to herein as "design images" are combined with the basic product image to create a composite image indicating the appearance of the printed product. When the design is completed to the user's satisfaction, the user can place an order through the site for production of a desired quantity of the corresponding printed product using a computer-to-textile printing system, such as the 93X Series of CMYK digital printers from Kornit Digital Ltd., or other suitable product printing system.

To avoid customer disappointment, it is desirable that the image of the product that is displayed to the customer on the customer's computer display be a substantially accurate representation of the physical product that the user will later receive. Trying to faithfully represent the appearance of printed areas has historically posed a problem because the appearance of the printed image may be affected by the color of the surface on which the image is printed. In the field of printing designs onto apparel, some printing systems are particularly adapted to print designs on dark materials. These systems typically first print a layer of white ink and then print the design on top of the white ink layer. This results in a faithful color reproduction of the design, but using such a system is more expensive to purchase and operate. The system itself contains additional white ink printing components, additional white ink is required, the printing process is slower because of the extra printing steps, and the drying time is longer because of the additional ink that is applied.

Other printing systems are particularly adapted to print designs on very light materials. These systems typically use only color inks, with any white areas in the design being treated as transparent. Because no ink is applied in the white areas of the design, the underlying material is visible. This type of system is typically less expensive to buy and operate than the dark material printing system, is capable of producing more units over the same period of time, and requires less product drying time. When this type of printing system is used to print a design onto white material, the customer receives a printed product that is generally substantially similar to the image displayed to the user on the user's computer system at the time the product was being ordered. However, if this type of printing system is used to print a design onto a material that is gray or another non-white color, the color of the material often affects the appearance of the design on the material, especially in areas of the printed design that are printed in lighter colors. For example, an image having areas of lighter colors that is printed on a white t-shirt will not have the same appearance as the same image printed on a gray t-shirt.

To minimize the risk of customer surprise and disappointment when the printed product is delivered, it is highly desirable that the customer be shown an image of the product that is as accurate a depiction of the physical product as possible. There is, therefore, a need for systems and methods that modify the product images that are displayed to the user based on the colors used in the design to give the customer a visual indication of how the appearance of the printed design will differ according to the colors in the design and the color of the surface onto which the image will be being printed.

SUMMARY

The present invention is directed at satisfying the need for automated systems and methods for generating images of products for displaying on a user's computer display in a manner that indicates the appearance of text and design elements that will be printed on the product.

In accordance with one embodiment of the invention, the opacity of each pixel in design images to be printed is determined according to the brightness of the pixel. Over much of the range of brightness values, pixel opacity remains relatively high, such that the composite blended pixel is somewhat impacted by the underlying image pixel, but to a relatively small degree. As the pixel brightness approaches high brightness levels, the opacity value associated with the pixel is reduced sharply, increasing the transparency of the pixel until the white pixels in the design image are completely transparent.

It is an advantage of the invention that a user is presented with a product image that indicates the actual effect of printing a design image having relatively light areas on a non-white product.

These and other objects, features and advantages of the invention will be better understood with reference to the accompanying drawings, description and claims.

DETAILED DESCRIPTION

It will be understood that, while the discussion herein describes an embodiment of the invention in the field of preparation of customized printed t-shirt, it will be understood that the invention is not so limited and is relevant to any application for displaying an image intended to depict the actual appearance of a product after the product has been printed.

Figure 1:
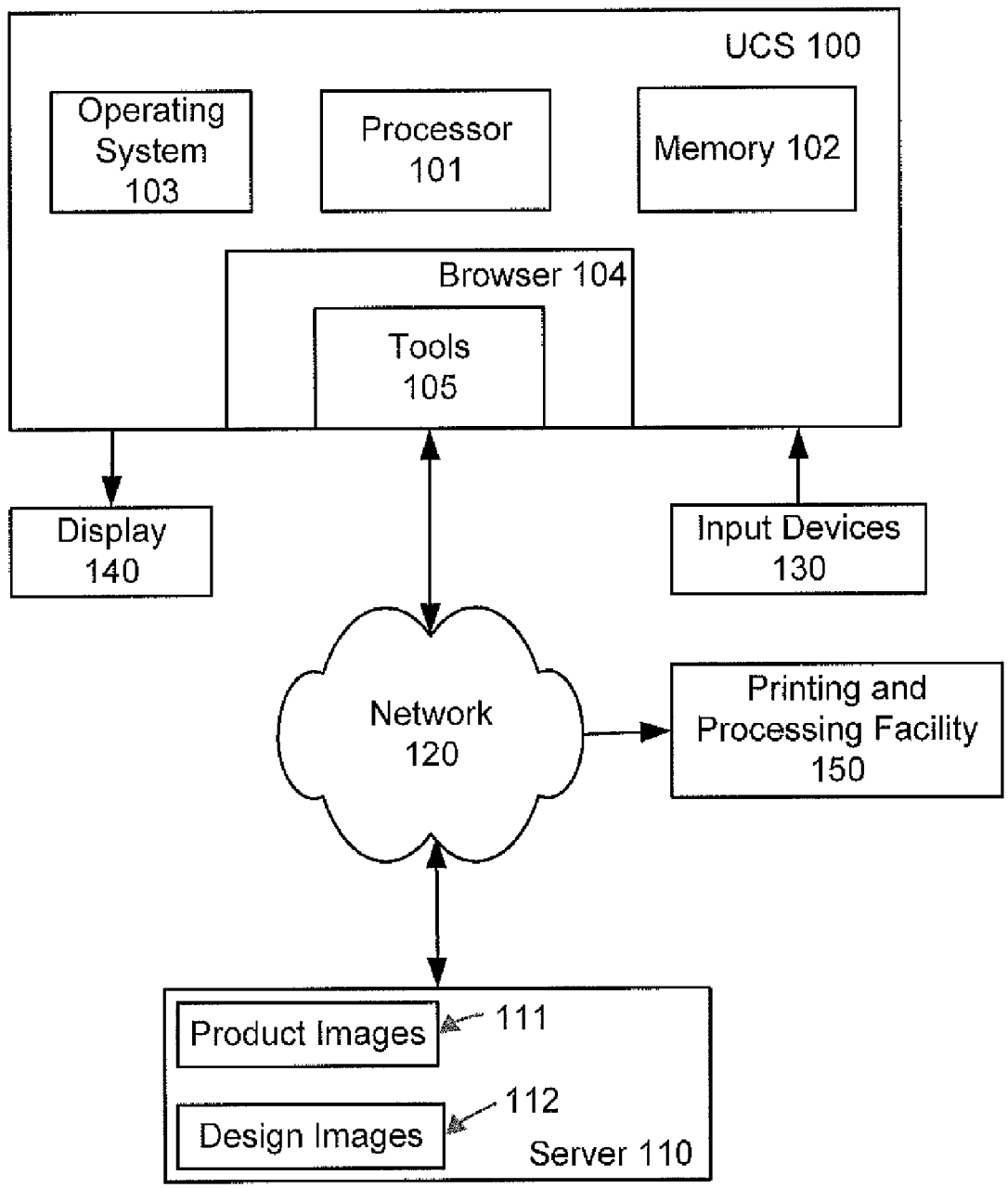
FIG. 1 shows an illustrative system with which the invention may be employed.

FIG. 1 depicts one illustrative system with which the invention may be employed. User computer system UCS 100 includes processor 101 and memory 102. Memory 102 represents all UCS 100 components and subsystems that provide data storage for UCS 100, such as RAM, ROM, and internal and external hard drives. In addition to providing permanent storage for all programs installed on UCS 100, memory 102 also provides temporary storage required by the operating system and any application program that may be executing. In the embodiment described herein, UCS 100 is a typically equipped personal computer, but UCS 100 could also be any other suitable device for interacting with server 110, such as a portable computer, a tablet computer, or a computer system particularly adapted or provided for electronic product design, such as a product design kiosk, workstation or terminal. The user views images from UCS 100 on display 140, such as a CRT or LCD screen, and provides inputs to UCS 100 via input devices 110, such as a keyboard and a mouse.

When UCS 100 is operating, an instance of the USC 100 operating system, for example a version of the Microsoft Windows operating system, will be running, represented in FIG. 1 by operating system 103. In FIG. 1, UCS 100 is running a Web browser 104, such as, for example, Internet Explorer from Microsoft Corporation. In the depicted embodiment, Tools 105 represents product design and ordering programs and tools downloaded to UCS 100 via Network 120 from remote Server 110, such as downloadable product design and ordering tools provided by VistaPrint Limited and publicly available at VistaPrinit.com. Tools 105 runs in browser 104 and exchanges information and instructions with Server 110 during a design session to support the user's preparation of a customized product. When the customer is satisfied with the design of the product, the design can be uploaded to Server 110 for storage and subsequent production of the desired quantity of the physical product on appropriate printing and post-print processing systems at printing and processing facility 150. Facility 150 could be owned and operated by the operator of Server 110 or could be owned and operated by another party.

While Server 110 is shown in FIG. 1 as a single block, it will be understood that Server 110 could be multiple servers configured to communicate and operate cooperatively to support Web site operations. Server 110 will typically be interacting with many user computer systems, such as UCS 100, simultaneously. Server 110 includes the components and subsystems that provide server data storage, such as RAM, ROM, and disk drives or arrays having stored thereon the various computer programs, product layouts, designs, colors, fonts, and other information to enable the creation and rendering of electronic product designs.

In the embodiment discussed herein, server 110 includes a number of stored images of various products, such as photographic images of various shirts and other items available for customization and purchase, collectively depicted in FIG. 1 as product images 111. Server 110 also retains a plurality of images and graphic elements that are available for the user to select and add to the user's shirt design for customization purposes. Tools 105 allow the use to enter one or more strings of text for incorporation into the design. The user's text information is transferred by tools 105 from UCS 100 to server 110 and server 110 creates a corresponding image of the appropriate size for displaying to the user. These user text images and the decorative images and graphics are collectively indicated in FIG. 1 as design images 112. While shown in FIG. 1 as two blocks, it will be understood that product images 111 and design images 112 could be stored in a single memory device or distributed across multiple memory devices.

In interacting with server 110 to create a custom product design, the user is typically presented with one or more screen displays (not shown) allowing the user to select a type of product for customization and then review thumbnail images of various design images prepared by the site operator and made available for incorporation into the product design by the user. To provide the customer with a wide range of design choices, each design image may comprise a combination of graphics, images, color schemes, and/or other design elements. The service provider has also pre-selected one or more default fonts to be used to render any text entered by the user. When a product and a design image have been selected by the user for customization, an initial product design page is downloaded from server 120 to UCS 100.

Figure 2:
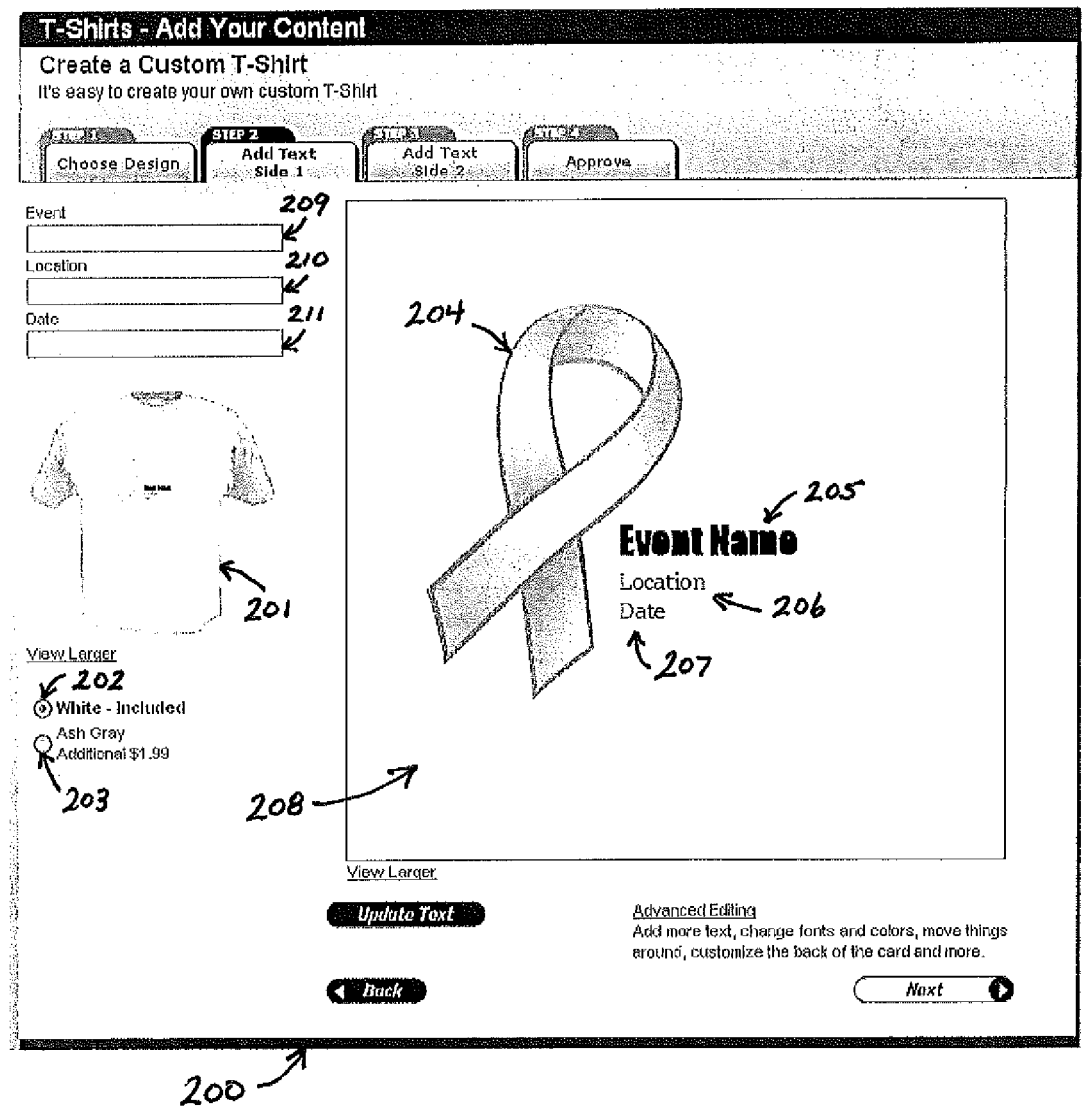
FIG. 2 shows an illustrative product design display.

FIG. 2 depicts an illustrative embodiment of product design page 200. Product image 201 depicts the selected product in combination with the design image and indicates the appearance of the finished printed product. In FIG. 2, product image 201 is an image of a white t-shirt, corresponding to the color selection indicated by radio button 202. Radio button 203 is provided to allow the user to select a gray shirt, if desired. Additional radio buttons, or other known selection mechanisms, for additional color choices could be employed, if desired.

In this example, the design that will be printed on the shirt is the combination of ribbon image 204 and three predefined text images 205-207 displayed on white background 208. With a printing system that is not adapted to print the color white, the white background 208 is not printed, therefore the underlying surface in those areas will be visible. In the depicted example, the service provider has initially provided default text images 205-207 with the placeholder text "Event Name", "Location" and "Date" to give the user an indication of the relative size and location of where and how the user's text entries will appear.

Text entry fields 209-211 are provided to allow the user to enter whatever characters the user desires to appear on the shirt in the areas 205-207. The characters entered by the user could include letters, numbers, punctuation marks or other symbols as supported by the site operator. All characters of all types entered by the user are collectively referred to herein as "text". Images corresponding to the user's text are created at server 110, returned to UCS 100 and rendered by tools 105 at the appropriate locations 205-207 relative to ribbon 204.

In this illustrative example, ribbon 204 is of a relatively light color, for example, yellow or pink. Further, ribbon 204 is not of a single uniform color, but has relatively lighter and darker areas that simulate the effects of light on the ribbon surface. Because of the relatively light colors used for much of the design, the ink applied by the printing system in those areas will not completely obscure the material of a non-white shirt. After printing, the non-white shirt material will be perceptible underneath the printed areas and the printed design will not appear exactly as when displayed against a white background. The degree to which the shirt material will be detectable is related to the relative brightness of the colors in the design. Darker colored areas of the design will more effectively obscure the underlying surface than brighter colors. User text entries printed on the shirt would be affected in the same manner.

Figure 3:
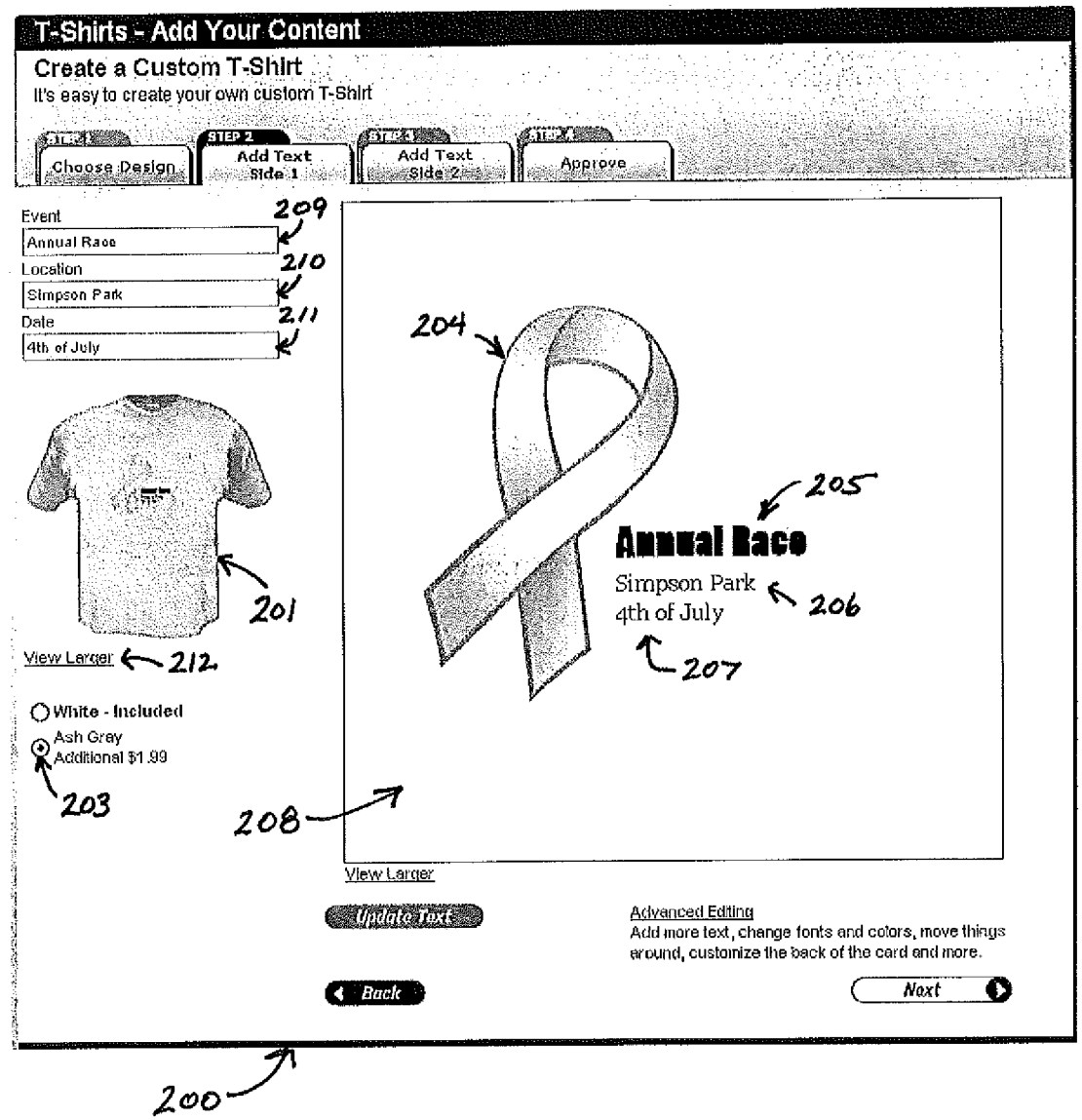
FIG. 3 shows the product display after user customization.

FIG. 3 illustrates the status of product design page 200 after the design image has been updated to reflect user text entries in text fields 209-211 and the user's selection of a gray shirt Using radio button 203 instead of the white shirt initially displayed. Product image 201 has been updated to incorporate the user's text entries and to indicate the gray shirt color chosen by the user. Because of the relatively small size of product image 201, "view larger" link 212 is provided to allow the user to request the displaying of a larger image of the current design.

Figure 4:
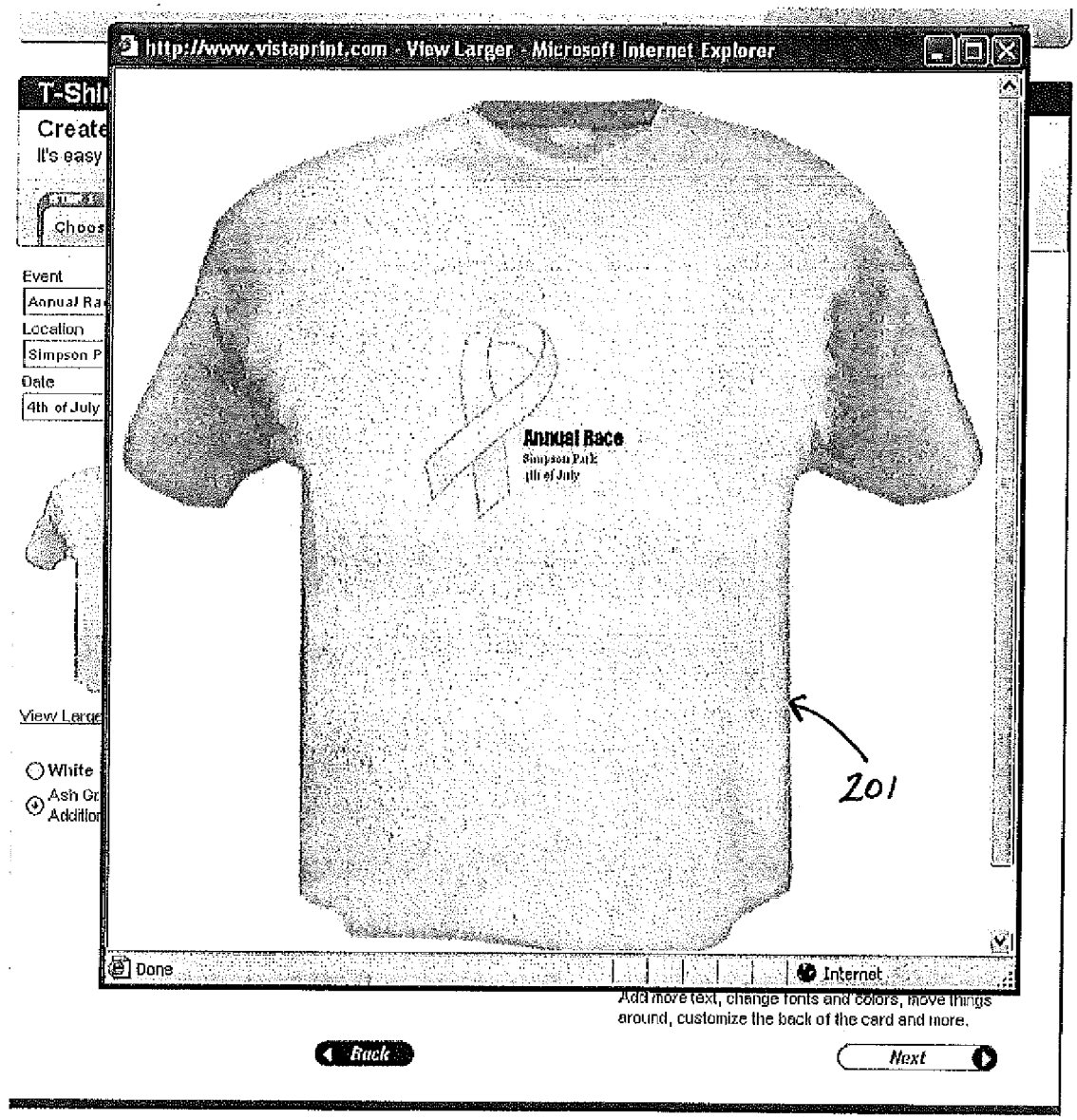
FIG. 4 shows an image of the customized product.

FIG. 4 depicts a larger version of product image 201 that is displayed to the user in response to the selection of link 212. As indicated by the image in FIG. 4, the ribbon image in product image 201 does not appear exactly the same as ribbon 204 in FIGS. 2 and 3. Product image 201 has been created by blending the design image with the underlying shirt image to create a composite product image that illustrates to the customer the actual appearance of the printed product. As will be discussed below, the blending of the images is performed by controlling, as necessary, the alpha value of each pixel of the design image.

As is well known and understood in the art, color images displayed on computer monitors are comprised of many individual pixels with the displayed color of each individual pixel being the result of the combination of the three colors red, green and blue (RGB). Each pixel has a parameter, generally referred to at the alpha value, which controls the "opacity" of the pixel during image blending operations. When one image is positioned over another image, the alpha value of the top pixel determines the extent to which the bottom pixel contributes to the composite blended image. A pixel alpha value equal to 1 indicates that the pixel is completely opaque and completely replaces or obscures the underlying pixel. An alpha value equal to 0 indicates that the top pixel is completely transparent and the underlying pixel is completely visible. If the alpha value is between 0 and 1, a blended composite pixel will result that is a combination of the top and bottom pixel. The relative amount to which each of the two pixels contribute to the blended pixel is controlled by the alpha value of the top pixel.

When a printing system that is not adapted to print with white ink is used to print designs onto a non-white surface, the printed product that results can be considered to be analogous to the blending of two images where the top image may have pixels with alpha values of less than 1. Areas of the printed product may have regions printed in bright colors where the result of the printing is a "blend" of the ink color and the underlying fabric color. As will be discussed below, in the disclosed embodiment, to indicate this outcome to the user, the opacity (alpha value) of each pixel in the design image is determined by a function resulting from two linear transforms.

Figure 5:
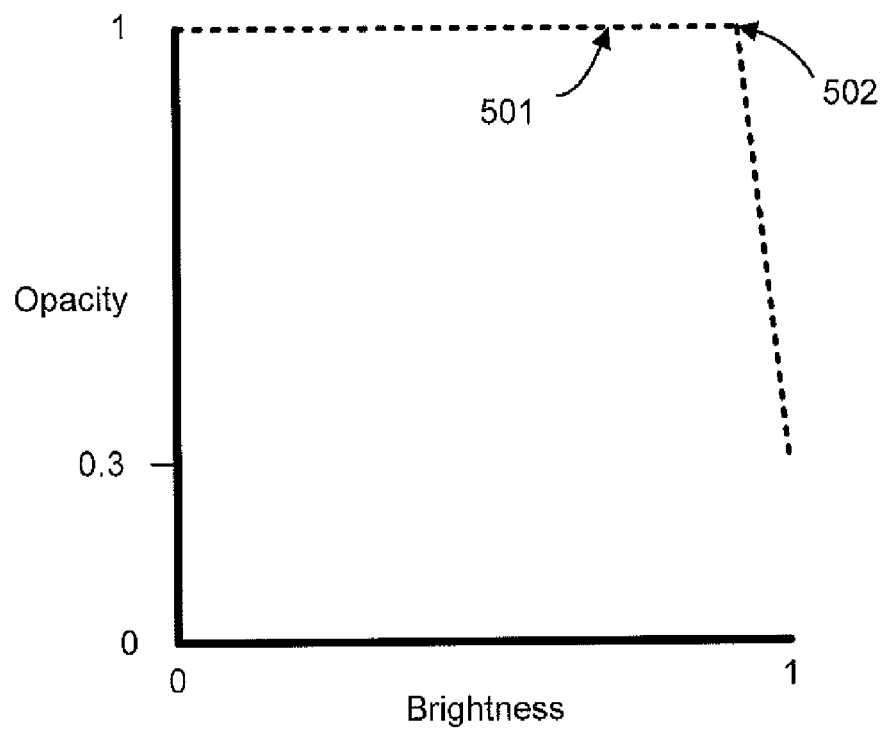
FIG. 5 is a graphical representation of an intermediate opacity adjustment.

Modern graphic rendering programs, such as the NET rendering engine from Microsoft, are typically adapted to perform linear pixel blending transformations. In the disclosed embodiment, two calculations are performed to determine the final opacity values that will be applied to the pixels in the design image. Dotted line 501 in FIG. 5 depicts an example of intermediate opacity values determined according to the function $$IO=(1/WC)*(1-B)+F$$

where IO equals the intermediate opacity value; B equals the brightness value of the pixel expressed as a decimal number between 0 and 1; F is an assigned brightness "fading" variable, expressed as a number between 0 and 1, to adjust the design image to account for the effect of the non-white surface on which the image will be printed; and WC is an assigned value, expressed as a number between 0 and 1, indicating the portion of the brightness range over which opacity values will be rapidly reduced to account for near white pixels. In the depicted example, the value of WC has been set to 0.05 and the value of F has been set to 0.3. For these values, inflection point 502 corresponds to a brightness value of 0.965. Therefore, for pixels having a brightness value between 0.965 and 1, the calculated intermediate opaqueness value will be rapidly, but not abruptly, reduced from an opaqueness of 1 at a brightness of 0.965 to an opaqueness of 0.3 at a brightness of 1. Because pixel opacity is constrained to fall within the range of 0 to 1, any opacity value calculation from the above function that exceeds 1 is set to equal 1.

Figure 6:
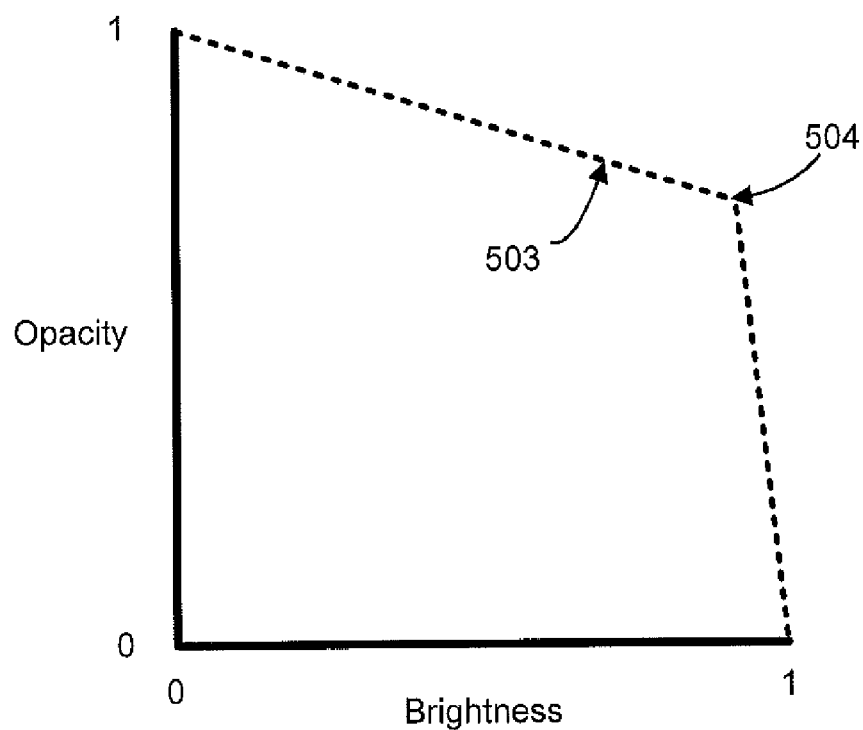
FIG. 6 is a graphical representation of a final opacity adjustment function.

FIG. 6 depicts an example of final opacity values determined by calculating the final opacity according to the function $$O=IO-(F*B)$$

where O is the final opacity value. For example, a pixel having a brightness of 0.8 (and therefore an intermediate opacity IO value of 1) would have a final opacity value of 0.76. This second step introduces a gradually increasing blending for pixels with brightness values from 0 until inflection point 504, corresponding to a brightness value of 0.965 and an opacity value of approximately 0.71, where the slope of the line increases until a totally white pixel is transparent with an opacity value of 0.

It will be understood that the function described herein are merely representative. For example, the values for WC and F can be varied as considered desirable. In addition, the embodiment described above has been designed to take advantage of the standard linear transform operations that are typically supported by commercially available blending programs and that can be performed relatively rapidly with minimal computational overhead. As an alternative, if the rapid computation of blending results is not a critical factor, custom blending code with greater processing overhead could be developed to vary opaqueness values according to a more complex computational function.

While an exemplary embodiment of the invention has been discussed, the described embodiment is to be considered as illustrative rather than restrictive. The scope of the invention is as indicated in the following claims and all equivalent methods and systems.

What is claimed is:

1. A computer-implemented method executed by one or more processors for modifying a digital image of a design to allow blending with an image of a product to represent the appearance of the product when imprinted with the design, comprising:

receiving by at least one of the one or more processors a digital design image to be printed onto the product, the digital design image comprising a plurality of pixels each having an associated brightness value and an associated opacity value, generating by at least one of the one or more processors a modified digital design image comprising each of the pixels of the digital design image adjusted such that the opacity value of each pixel in the modified digital design image corresponding to a respective pixel in the digital design image whose associated brightness value corresponds to completely dark is set to a first predetermined opaque value, the opacity value of each pixel in the modified digital design image corresponding to a respective pixel in the digital design image whose associated brightness value corresponds to completely bright is set to a transparent value, and the opacity value of at least some pixels in the modified digital design image corresponding to a respective pixel in the digital design image whose associated brightness value corresponds to a brightness value between completely dark and completely bright is set to a corresponding opacity value dependent on the brightness value of the respective pixel such that the opacity value of at least one pixel whose associated brightness value corresponds to a brightness value that is darker than at least one other pixel is set to an opacity value representing greater opacity than the opacity value of the at least one other pixel.

2. The computer-implemented method of claim 1, further comprising:
receiving by at least one of the one or more processors a digital product image containing the image of the product, and
overlaying by at least one of the one or more processors the modified digital design image onto the digital product image on an electronic display to display a blended digital product image.

3. The computer-implemented method of claim 1, wherein:
over a predetermined range of brightness values, the opacity value of each pixel in the modified digital design image is set above a predetermined opacity value by at least one of the one or more processors, and
above a predetermined high brightness level, the opacity value associated with the respective pixel is set below the predetermined opacity value by at least one of the one or more processors.

4. The computer-implemented method of claim 1, wherein:
in the modified digital design image the opacity value of each pixel corresponding to a pixel in the design image whose brightness value corresponds to completely dark is set by at least one of the one or more processors to an opacity value corresponding to completely opaque, and the opacity value of each pixel corresponding to a pixel in the design image whose brightness value corresponds to completely bright is set by at least one of the one or more processors to an opacity value corresponding to completely transparent.

5. The computer-implemented method of claim 2, wherein at least a portion of the digital product image that is overlaid by the modified digital design image is a non-white color.

6. The computer-implemented method of claim 1, further comprising
accessing by at least one of the one or more processors a digital product image containing the image of the product, and
wherein the opacity value of each pixel in the modified design image is adjusted by at least one of the one or more processors by:
determining an intermediate opacity value according to the function $$IO = (1/WC) * (1-B) + F$$

where IO is the intermediate opacity value, B is the brightness value of the pixel normalized between 0 and 1, F is an assigned fading variable normalized between 0 and 1 indicating an amount to adjust the pixel to account for the brightness level of the corresponding pixel of the digital product image, and WC is an assigned value, expressed as a number between 0 and 1, indicating a portion of the brightness range over which opacity values are sharply reduced to account for nearly completely bright pixels; and
setting the opacity value according to the function $$O = IO - (F * B)$$

where O is the opacity value.

7. Non-transitory computer readable storage comprising computer readable instructions which, when executed by a computer, together perform a method for modifying a digital image of a design to allow blending with an image of a product to represent the appearance of the product when imprinted with the design, the method comprising:
receiving by at least one of the one or more processors a digital design image to be printed onto the product, the digital design image comprising a plurality of pixels each having an associated brightness value and an associated opacity value, generating by at least one of the one or more processors a modified digital design image comprising each of the pixels of the digital design image adjusted such that the opacity value of each pixel in the modified digital design image corresponding to a respective pixel in the digital design image whose associated brightness value corresponds to completely dark is set to a first predetermined opaque value, the opacity value of each pixel in the modified digital design image corresponding to a respective pixel in the digital design image whose associated brightness value corresponds to completely bright is set to a transparent value, and the opacity value of at least some pixels in the modified digital design image corresponding to a respective pixel in the digital design image whose associated brightness value corresponds to a brightness value between completely dark and completely bright is set to a corresponding opacity value dependent on the brightness value of the respective pixel such that the opacity value of at least one pixel whose associated brightness value corresponds to a brightness value that is darker than at least one other pixel is set to an opacity value representing greater opacity than the opacity value of the at least one other pixel.

8. The non-transitory computer readable storage of claim 7, the method further comprising:
receiving by at least one of the one or more processors a digital product image containing the image of the product, and
overlaying by at least one of the one or more processors the modified digital design image onto the digital product image on an electronic display to display a blended digital product image.

9. The non-transitory computer readable storage, of claim 7, wherein:
over a predetermined range of brightness values, the opacity value of each pixel in the modified digital design image is set above a predetermined opacity value by at least one of the one or more processors, and
above a predetermined high brightness levels, the opacity value associated with the respective pixel is set below the predetermined opacity value by at least one of the one or more processors.

10. The non-transitory computer readable storage of claim 7, wherein:
in the modified digital design image the opacity value of each pixel corresponding to a pixel in the design image whose brightness value corresponds to completely dark is set by at least one of the one or more processors to an opacity value corresponding to completely opaque, and the opacity value of each pixel corresponding to a pixel in the design image whose brightness value corresponds to completely bright is set by at least one of the one or more processors to an opacity value corresponding to completely transparent.

11. The non-transitory computer readable storage of claim 8, wherein at least a portion of the digital product image that is overlaid by the modified digital design image is a non-white color.

12. The non-transitory computer readable storage, of claim 7, the method further comprising accessing by at least one of the one or more processors a digital product image containing the image of the product, and wherein the opacity value of each pixel in the modified design image is adjusted by:

determining an intermediate opacity value according to the function $$IO=(1/WC) * (I-B)+F$$

where IO is the intermediate opacity value, B is the brightness value of the pixel normalized between 0 and 1, F is an assigned fading variable normalized between 0 and 1 indicating an amount to adjust the pixel to account for the brightness level of the corresponding pixel of the digital product image, and WC is an assigned value, expressed as a number between 0 and 1, indicating a portion of the brightness range over which opacity values are sharply reduced to account for nearly completely bright pixels; and setting the opacity value according to the function $$O=IO-(F * B)$$

where O is the opacity value.

13. A system for generating a digital image of a design that is blendable with an image of a product to represent the appearance of the product when imprinted with the design, comprising:

computer storage means for storing a digital design image to be printed onto the product, the digital design image comprising a plurality of pixels each having an associated brightness value and an associated opacity value, processing means for generating by at least one of the one or more processors a modified digital design image comprising each of the pixels of the digital design image adjusted such that the opacity value of each pixel in the modified digital design image corresponding to a respective pixel in the digital design image whose associated brightness value corresponds to completely dark is set to a first predetermined opaque value, the opacity value of each pixel in the modified digital design image corresponding to a respective pixel in the digital design image whose associated brightness value corresponds to completely bright is set to a transparent value, and the opacity value of at least some pixels in the modified digital design image corresponding to a respective pixel in the digital design image whose associated brightness value corresponds to a brightness value between completely dark and completely bright is set to a corresponding opacity value dependent on the brightness value of the respective pixel such that the opacity value of at least one pixel whose associated brightness value corresponds to a brightness value that is darker than at least one other pixel is set to an opacity value representing greater opacity than the opacity value of the at least one other pixel.

14. The system of claim 13, further comprising:

computer storage means for storing a digital product image of the product, processing means for overlaying the modified digital design image onto the digital product image on an electronic display to display a blended digital product image.

15. The system of claim 13, wherein:

over a predetermined range of brightness values, the opacity value of each pixel in the modified digital design image is set above a predetermined opacity value by at least one of the one or more processors, and above a predetermined high brightness levels, the opacity value associated with the respective pixel is set below the predetermined opacity value by at least one of the one or more processors.

16. The system of claim 13, wherein:

in the modified digital design image the opacity value of each pixel corresponding to a pixel in the design image whose brightness value corresponds to completely dark is set by at least one of the one or more processors to an opacity value corresponding to completely opaque, and the opacity value of each pixel corresponding to a pixel in the design image whose brightness value corresponds to completely bright is set by at least one of the one or more processors to an opacity value corresponding to completely transparent.

17. The system of claim 14, wherein at least a portion of the digital product image that is overlaid by the modified digital design image is a non-white color.

18. The system of claim 13, further comprising:

computer storage means for storing a digital product image of the product, and wherein the processing means comprises:

processing means for determining an intermediate opacity value according to the function $$IO=(1/WC) * (I-B)+F$$

where IO is the intermediate opacity value, B is the brightness value of the pixel normalized between 0 and 1, F is an assigned fading variable normalized between 0 and 1 indicating an amount to adjust the pixel to account for the brightness level of the corresponding pixel of the digital product image, and WC is an assigned value, expressed as a number between 0 and 1, indicating a portion of the brightness range over which opacity values are sharply reduced to account for nearly completely bright pixels; and processing means for setting the opacity value according to the function $$O=IO-(F * B)$$

where O is the opacity value.

19. A system for generating a digital image of a design that is blendable with an image of a product to represent the appearance of the product when imprinted with the design, comprising:

computer memory which stores a digital design image to be printed onto the product, the digital design image comprising a plurality of pixels each having an associated brightness value and an associated opacity value, one or more processors which generate, based on the digital design image, a modified digital design image comprising each of the pixels of the digital design image adjusted such that the opacity value of each pixel in the modified digital design image corresponding to a respective pixel in the digital design image whose associated brightness value corresponds to completely dark is set to a first predetermined opaque value, the opacity value of each pixel in the modified digital design image corresponding to a respective pixel in the digital design image whose associated brightness value corresponds to completely bright is set to a transparent value, and the opacity value of at least some pixels in the modified digital design image corresponding to a respective pixel in the digital design image whose associated brightness value corresponds to a brightness value between completely dark and completely bright is set to a corresponding opacity value dependent on the brightness value of the respective pixel such that the opacity value of at least one pixel whose associated brightness value corresponds to a brightness value that is darker than at least one other pixel is set to a more opaque value than the opacity value of the at least one other pixel.

20. The system of claim 19, further comprising: an electronic display; wherein the computer memory stores a digital product image of the product and the one or more processors overlay the modified digital design image onto the digital product image on the electronic display to display a blended digital product image.

21. The system of claim 20, wherein at least a portion of the digital product image that is overlaid by the modified digital design image is a non-white color.

22. The system of claim 19, further comprising:
non-transitory computer readable storage which stores a digital product image of the product, and
wherein the one or more processors determine an intermediate opacity value according to the function $$IO=(1/WC)*(I-B)+F$$

where IO is the intermediate opacity value, B is the brightness value of the pixel normalized between 0 and 1, F is an assigned fading variable normalized between 0 and 1 indicating an amount to adjust the pixel to account for the brightness level of the corresponding pixel of the digital product image, and WC is an assigned value, expressed as a number between 0 and 1, indicating a portion of the brightness range over which opacity values are sharply reduced to account for nearly completely bright pixels; and
set the opacity value according to the function $$O=IO-(F*B)$$

where O is the opacity value.

* * * * *